May 27, 1952      J. H. HERRERA      2,598,377
PRESSURE FEEDER DEVICE FOR INFUSION STRAINERS
Filed Aug. 31, 1949      3 Sheets-Sheet 1
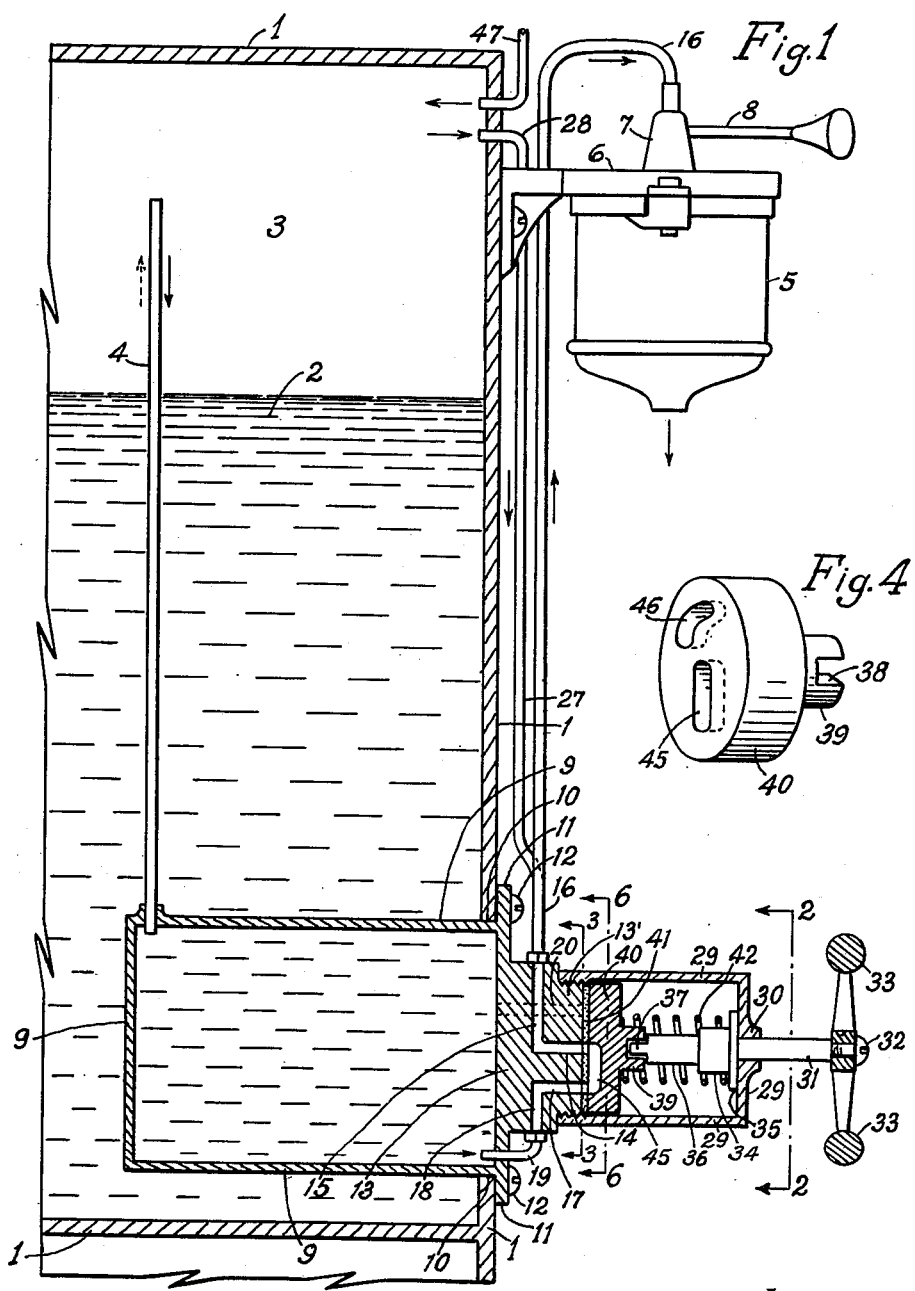
INVENTOR.
Juan Hernandez Herrera
BY Singer, Stern & Carlberg
ATTORNEYS May 27, 1952
J. H. HERRERA
2,598,377
PRESSURE FEEDER DEVICE FOR INFUSION STRAINERS
Filed Aug. 31, 1949
3 Sheets-Sheet 2
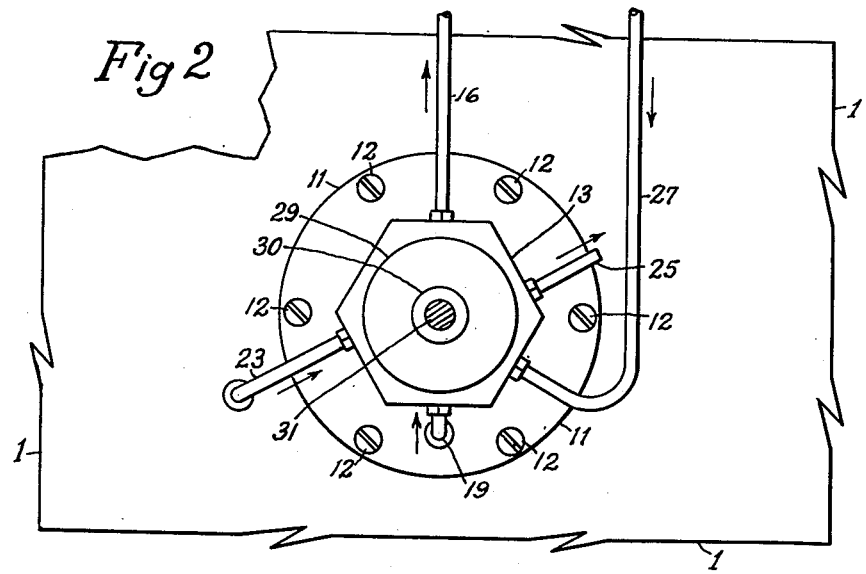
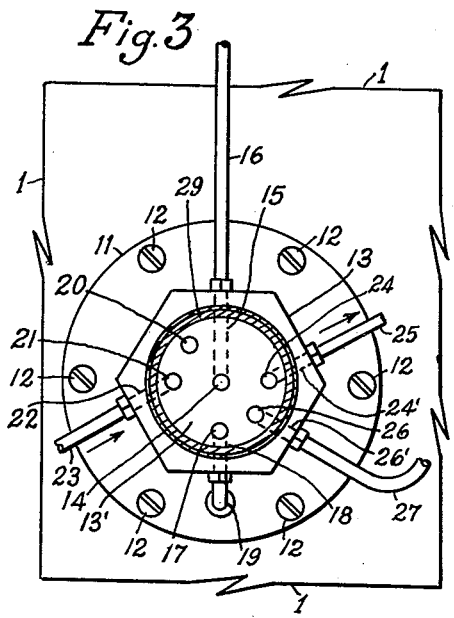
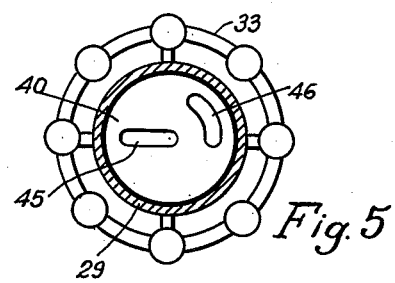
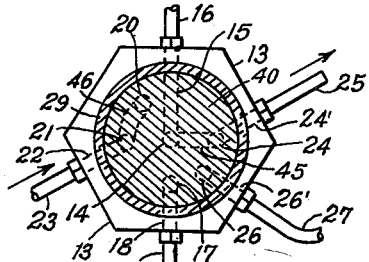
INVENTOR.
Juan Hernandez Herrera
BY
Singer, Stern & Carlberg
ATTORNEYS May 27, 1952        J. H. HERRERA        2,598,377
PRESSURE FEEDER DEVICE FOR INFUSION STRAINERS
Filed Aug. 31, 1949        3 Sheets-Sheet 3
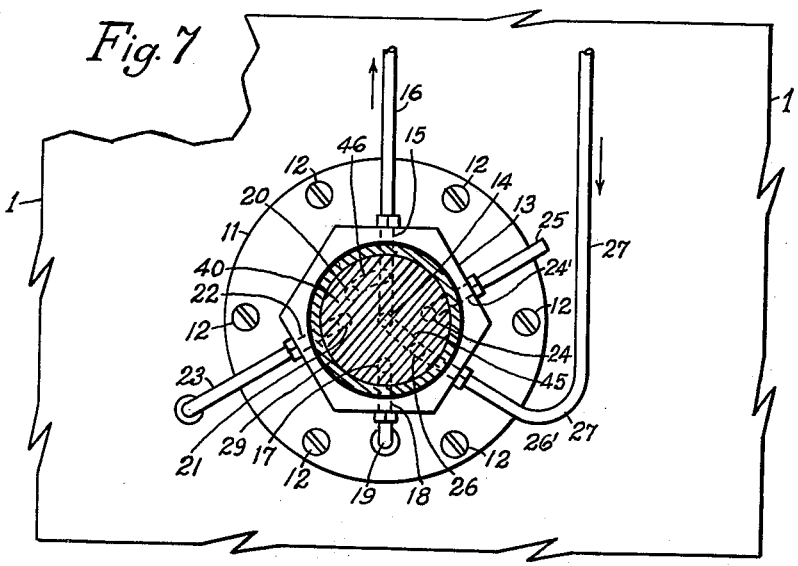
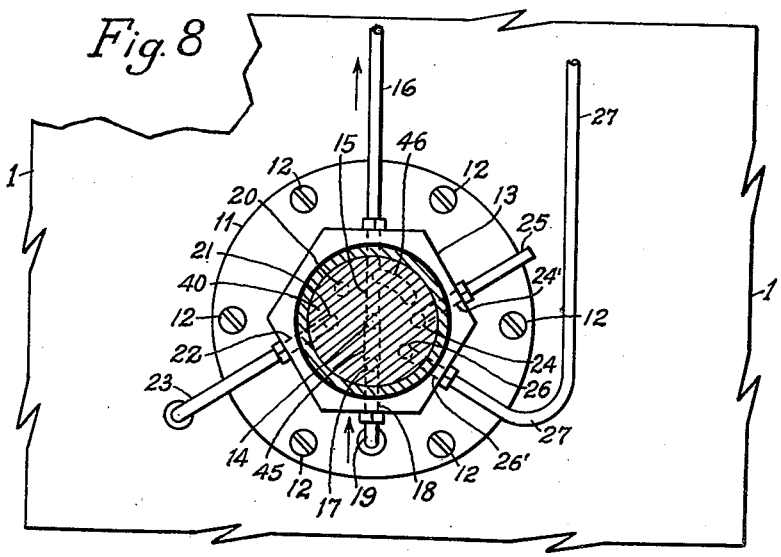
INVENTOR.
BY Juan Hernandez Herrera
Singer, Stein & Carlberg
ATTORNEYS Patented May 27, 1952

2,598,377

UNITED STATES PATENT OFFICE 2,598,377

PRESSURE FEEDER DEVICE FOR INFUSION STRAINERS

Juan Hernandez Herrera, Habana, Cuba

Application August 31, 1949, Serial No. 113,264
In Cuba June 11, 1949

1 Claim. (Cl. 222—394)

This invention relates to the so-called "coffee-making" devices for serving strained coffee infusions at cafes, hotels, restaurants, etc.

The object of this invention is to provide in connection with steam generators for use with swift strainer devices, a pressure feeder device adapted to supply a pre-determined amount of hot water into the strainer device, which hot water is to be contained in a container enclosed within the space occupied by the steam-boiler and which is supplied with hot water from the very boiler, said container being in communication through a tube with the boiler steam space, and by means of such pressure to which is added the pressure of compressed air from a suitable compressor, the pre-determined hot-water amount contained in said container is introduced into the coffee strainer attached to the boiler by means of a three-way valve in an end communication passageway formed by said valve and which will preferably have two additional passageways through one of which the steam water from the boiler is caused to pass into the strainer to heat it sufficiently to compensate heat losses by radiation, and through the other passageway of the valve the hot water from the boiler will be fed into the pre-determined-amount water container once the latter is emptied, all of these operations being attained by simply rotating a hand-wheel adapted to control the various passageways of the valve for the service of coffee strainer, whereupon a great degree of efficiency will be attained in the quick service of swift coffee strainers.

The invention is described with reference to the figures of the accompanying drawings, of which:

Fig. 1 is a vertical section view of a steam boiler having therein a closed container of a pre-determined capacity for supplying hot water to a coffee strainer attached to the boiler, a three-way valve attached to said container and constructed according to this invention being shown in diametral section, which valve is mounted outside the boiler.

Fig. 2 is a view of the valve in cross-section on line 2—2 of Fig. 1, which also shows the various tubes leading from the valve to the boiler steam space, to the boiler steam chamber of the boiler, and to the coffee strainer attached to the boiler.

Fig. 3 is a cross-section view of the valve on the plane separating the stationary and movable members of the valve or on line 3—3 of Fig. 1.

Fig. 4 is a perspective detailed view of the valve movable member being at the front of the face remaining adjacent the stationary member of the valve.

Fig. 5 is a detailed front view of the movable member of the valve, in a different position from that of Fig. 4.

Fig. 6 is a cross-section view of the valve through the movable member thereof or on line 6—6 of Fig. 1, showing the connections for the feeding of water from the boiler into the container to which is attached the three-way valve.

Fig. 7 is a similar view to that of Fig. 6, showing the connections to feed the coffee strainer with steam from the boiler.

Fig. 8 is a similar view to that of Fig. 6, showing the connections for introducing into the coffee strainer hot water from the container to which is attached the three-way valve.

In the drawings, 1 indicates in partial vertical section a steam boiler for the service of coffee strainers, 2 indicates the water contained in the boiler, 3 indicates the steam chamber of the boiler, 5 indicates the coffee strainer attached to the boiler and supported outside the top portion thereof by means of a supporting arm 6, and 7 indicates a valve cone the valve of which is operated by means of a handle 8.

This invention comprises a cylindrical metallic container 9 of a pre-determined capacity, which is inserted within the space occupied by the water 2 from boiler 1, through a big opening 10 in the peripherial wall of boiler 1, and the container 9 is provided with an outer vertical flange 11 superposed to said peripherial wall and secured thereto by screws 12. The container 9 is in communication with the steam chamber 3 of the boiler through a tube 4 and said container 9 has integrally secured to its outer vertical wall a solid hexagonal body 13 having therein six horizontal conduits, to wit: a central conduit 14 opened at its outer face and communicated with a radial conduit 15 within the stationary body 13 which opens at the top peripherial face thereof where it is connected with a tube 16 leading to the valve cone 7 forming an accessory of the strainer 5; a lower conduit 17 situated at the same vertical plane as the central conduit 14 and opened also at the outer face of the stationary body 13 and in communication with a radial conduit 18 within the stationary body 13, which opens at the lower peripherial face thereof and is connected there with an elbowed tube 19 leading to the interior of container 9 across a hole in its outer vertical wall; a top lateral conduit 20 leading horizontally from the outer face to the inner face of the solid body 13; an intermediate lateral horizontal conduit 21 opening at the outer face of the stationary body 13 and in communication with a radial conduit 22 thereof which opens at the lower lateral peripheral wall of the latter body and is connected there with an elbowed tube 23 communicating with the water space 2 of the boiler; an intermediate lateral horizontal conduit 24 at the opposed side of the stationary body 13 which opens at the outer face of the stationary body 13 and is in communication with the radial tube 24' opening at the top lateral peripheral face of the opposed side of stationary body 13 and connected there with an exhaust tube 25; and another lower lateral horizontal conduit 26 at the same opposed side of the stationary body 13, which opens at the outer face of the latter and communicates with a radial tube 26' opening at the lower lateral peripherial face of the stationary body 13 and connected there with a tube 27 extending vertically adjacent the boiler 1 and through an elbow 28 opens in the steam chamber 3 of boiler 1.

The solid hexagonal body 13 forms the stationary member of a three-way valve and to that end it terminates in a cylindrical extension 13' having threads at its periphery to screw within a cylindrical casing 29 having at its outer vertical face an opening 30 for the passage of the valve stem 31 to the outside of which is secured by a screw 32 a hand-wheel 33 and said stem 31 extends interiorly of cylindrical casing 29 to form three bodies of dissimilar diameter, to wit, an outer body of greater diameter 34 provided with an annular flange 35 joined to body 36 of less diameter, and an end body 37 of reduced diameter which properly forms a pin adapted to be inserted in a diametral slot 38 of a central reduced extension 39 of the cylindrical body 40 constituting the valve movable member or rotor fitting within the cylindrical casing 29, the rotor 40 being spaced apart from the stationary body 13 through a packing disc 41 provided with two holes situated oppositely the ends of horizontal conduits 14 and 17. The cylindrical body 40 rests against the packing disc 41 by means of the pressure exerted against same by the elastic tension of a coil spring 42 wound about extension 39 and on the body of greater diameter 34 of the valve stem 31 and rests at its inner end against the outer face of the movable member 40 and at its outer end on the flange 35 of body 34. Said cylindrical body 40 has formed at its inner face two grooves, namely a straight groove 45 in radial direction and being of a length equal to the distance between both horizontal conduits 14 and 17 of the stationary member 13, and the groove 46 is curved with its circle-arc curvature concentric with the circular edge of the inner face of said cylindrical body 40, its length being equal to the circle-arc separating both lateral conduits 20 and 21 of the stationary body 13 so that upon registering with the two latter it will establish a communication between the water space of boiler 1 and the inner space of container 9 respectively.

The boiler 1 is also provided with a tube 47 opening into the steam chamber 3 thereof, and the same is adapted to feed compressed air into the steam chamber 2 from an air compressor which is not shown as its construction is well known and does not form an essential part of this invention.

In Figs. 6, 7 and 8 are illustrated the three positions of the movable member 40 of the three-way valve corresponding to the various connections which are necessary for the proper operation of the coffee strainer 5 and which are set through hand rotation of the wheel 33. Fig. 6 shows the position of the three-way valve in which the connections are made to supply hot water from the boiler into the container 9, said figure also showing the manner in which through rotation of the valve movable member 40 the curved groove 46 of said member communicates the two horizontal conduits 20 and 21 of the valve stationary member 13 through said groove, at the same time that the straight groove 45 communicates the central conduit 14 with the lateral conduit 24, whereby hot water 2 contained in the boiler 1 passes through elbowed tube 23 and radial conduit 22 into horizontal conduit 21, from the latter to the curved groove 46, from the latter to the horizontal conduit 20 leading from the outer face to the inner face of stationary member 13 and opens into the container 9 to fill it, at the same time that the strainer 5 is communicated through straight groove 45 with the tube 25 through the central conduit 14 and lateral conduit 24 to allow the egress of gases from strainer 5.

Fig. 7 shows the connections for supplying strainer 5 with steam from boiler 1 to heat it preparatory to its straining operation, to which end the hand-wheel 33 is operated to rotate the movable member 40 so that the straight groove 45 will communicate the lateral conduit 26 with the central conduit 14, whereupon the steam contained in the chamber 2 of the boiler 1 will pass through tube 27 into radial conduit 26' and from the latter into the horizontal conduit 26 and then through straight groove 45 into central conduit 14 wherefrom the steam will pass through radial conduit 15 into the tube 16 leading to the valve cone 7 of strainer 5, and upon opening the valve of cone 7 through operating the handle 8 thereof, the steam will pass into the strainer 5 to heat it.

Fig. 8 illustrates the connections whereby the hot water contained in the container 9 is introduced in a pre-determined volume into the coffee strainer 5. Said figure shows the manner in which the movable member 40 of the three-way valve has been rotated so that the straight groove 45 will communicate the lower horizontal conduit 17 with the central horizontal conduit 14, whereupon compressed air and steam contained in said steam chamber 2 will act through tube 4 communicating said chamber with the interior of the container 9 to introduce into strainer 5 all hot water contained in the said container, through elbowed tube 19, radial conduit 18, horizontal conduit 17, straight groove 45, central horizontal conduit 14, radial conduit 15, tube 16, valve cone 7 and strainer 5, upon operating the handle 8 to open the valve of cone 7.

After hot water has been introduced under pressure in the strainer 5 and coffee infusion obtained therein, the container 9 is again fed with hot water from the boiler through operating the hand-wheel 33 of the three-way valve and bringing curved groove 46 of valve movable member 40 into the position indicated in Fig. 6, that is, by inter-communicating the two horizontal conduits 20 and 21 of the stationary member 13 of the valve, whereupon the hot water contained in the boiler will pass through elbowed tube 23 and radial conduit 22 into the horizontal conduit 21, from the latter to the curved groove 46, and from the latter into the horizontal conduit 20 opening in the container 9. In this manner the three-operation cycle is repeated for the feeding of hot water from the boiler to the coffee strainer.

As it is seen, through operation of the hand-wheel 33 which controls the rotation of the movable member 40 of the three-way valve, the three above mentioned operations will be performed quickly and safely, without any loss of time in feeding operations including the operation of a plurality of valves as it has been the case heretofore.

It is obvious that changes may be made in the shape and position of the container within the steam boiler, and even to omit one of the three passageways of the valve, i. e. the passage of steam from the boiler directly into the strainer, without thereby altering the essential character of the invention which is such as claimed hereinafter.

What I claim is:

A pressure feeder device for feeding a predetermined volume of hot water from a steam boiler to a point of use, comprising in combination with the steam boiler; a closed container secured to said boiler and inserted within the water space thereof through an opening in the peripheral wall thereof; means establishing communication between the steam space of said boiler and said container; a multiple-way valve; conduit means establishing communication between said valve and said point of use; said valve comprising a hexagonal member formed integrally with the outer wall of said container, said hexagonal member having an outer cylindrical extension and a plurality of conduits all opening at the outer face of said cylindrical extension and communicating respectively with the water space of said boiler, with the steam space of said boiler, with said container, with said conduit means and with the atmosphere, a cylindrical casing detachably secured to said cylindrical extension, a rotatably cylindrical member fitted within said casing and having its inner face positioned adjacent the outer face of said cylindrical extension, said cylindrical member having in its inner face a straight groove and a curved groove adapted to separately inter-communicate two groups of two of said conduits in said hexagonal member, and manually operated means connected to said cylindrical member and mounted on said casing for rotating said cylindrical member; and means for supplying compressed air to the steam space of said boiler; whereby upon step-by-step positioning of said cylindrical member of said valve feeding takes place as follows: hot water is fed under pressure from said boiler to said container and at the same time communication is established between said conduit means and atmosphere; steam is fed from said boiler directly to said conduit means; and hot water is fed under pressure from said container to said conduit means.

JUAN HERNANDEZ HERRERA.

REFERENCES CITED

The following references are of record in the file of this patent:

UNITED STATES PATENTS

| Number | Name | Date |
|---|---|---|
| 1,042,216 | Grant | Oct. 22, 1912 |
| 1,385,593 | Strohbach | July 26, 1921 |
| 1,580,501 | Lambert | Apr. 13, 1926 |
| 1,673,696 | Merry | June 12, 1928 |
| 2,464,862 | Herrera | Mar. 22, 1949 |

FOREIGN PATENTS

| Number | Country | Date |
|---|---|---|
| 356,987 | Italy | Feb. 24, 1938 |
| 689,600 | France | May 27, 1930 |